United States Patent [19]

Yamada et al.

[11] Patent Number: 4,632,948

[45] Date of Patent: Dec. 30, 1986

[54] VINYL CHLORIDE RESIN COMPOSITION AND MOLDED PRODUCTS USING SAME

[75] Inventors: Tetsuya Yamada, Yotsukaidoshi; Shigehiro Koga, Ichiharashi; Kazuyoshi Imai; Kazuo Inaba, both of Fujinomiyashi, all of Japan

[73] Assignees: Chisso Corporation, Osakafu; Nihon Plast Co., Ltd., Shizuokaken, both of Japan

[21] Appl. No.: 676,850

[22] Filed: Nov. 30, 1984

[30] Foreign Application Priority Data

Dec. 14, 1983 [JP] Japan ................................ 58-235279

[51] Int. Cl.$^4$ .............................................. C08K 3/40
[52] U.S. Cl. .................................... 523/219; 523/218; 428/463
[58] Field of Search ................. 523/218, 219; 524/494; 525/222, 226; 428/463

[56] References Cited

U.S. PATENT DOCUMENTS

| | | | |
|---|---|---|---|
| 3,247,158 | 4/1966 | Alford | 524/494 |
| 4,388,424 | 6/1983 | Kennell et al. | 523/219 |
| 4,391,944 | 7/1983 | Yamane et al. | 524/548 |

*Primary Examiner*—Paul R. Michl
*Attorney, Agent, or Firm*—Leydig, Voit & Mayer

[57] ABSTRACT

A vinyl chloride resin composition made lightweight and delustered and having a superior abrasion resistance and a good microballoon-retainability, and molded products such as steering wheel using the same are provided, which composition comprises 100 parts by weight (hereinafter "by weight" omitted) of a vinyl chloride copolymer consisting of 97.0~99.95% of vinyl chloride and 3.0 to 0.05% of a polyethylene glycol di(meth)acrylate having a specified number of ethylene glycol polymerization units and a specified average polymerization degree, 5 to 100 parts of microballoons having a specified s.g., particle diameter and compressive strength, 1 to 20 parts of polyvinyl acetate having a specified average polymerization degree and 30 to 150 parts of a plasticizer.

9 Claims, 3 Drawing Figures

VINYL CHLORIDE RESIN COMPOSITION AND MOLDED PRODUCTS USING SAME

BACKGROUND OF THE INVENTION

This invention relates to a vinyl chloride resin composition made both low in density and delustered and having a superior abrasion resistance and a good microballoon-retainability, and molded products using the same such as steering wheel.

Vinyl chloride resins have superior physical and chemical properties and molding processability and are relatively cheap, and hence have been broadly used for various applications. However, vinyl cloride resins have specific gravities as high as 1.41 and even soft vinyl chloride resins obtained by blending a plasticizer therewith usually have specific gravities of 1.2~1.4. Thus the resins have a serious drawback that they are much heavier than general-purpose synthetic resins, for example, heavier by 30~60% than polypropylene and by 200~250% than foamed polyurethane. Further, vinyl chloride resins have other drawbacks in that molded products of vinyl chloride resins have an intense surface luster so that they cause a cheap feeling, and their hand feeling is bad (a sticky feeling).

As to the process for making vinyl chloride resins lightweight, foaming processes have been employed, but they have associated therewith various problems such as the molding cycle is long, the product yield is inferior, their reuse is impossible, etc.; hence they have not yet been fully satisfactory.

As to making low density and low luster vinyl chloride resins, the present inventors found that a composition having microballoons and a plasticizer blended with a copolymer of vinyl chloride with polyethylene glycol diacrylate or polyethylene glycol dimethacrylate has superior properties, and applied for patent (Japanese Patent Application No. Sho 58-74500/1983). However, as the amount of microballons blended in the above composition increased, there occurred a phenomenon that microballoons exposed on the surface of molded products slipped off due to abrasion to reduce the commodity value of the molded products. Particularly when such a low density composition was used as a covering layer on steering wheels of autocars, etc., a problem of slipping off of the microballoons due to abrasion was raised, and further vinyl chloride resins having a large amount of such a filler blended therein are liable to have reduced mechanical strength, and also peeling off of the covering layer from the metal core of steering wheels as well as collapse of the covering layer are liable to occur. Thus these drawbacks have constituted a most serious obstacle to the attempt of making vinyl chloride resins lightweight by increasing the amount of microballoons blended.

The present inventors have made extensive research in order to overcome the above problems of vinyl chloride resin compositions using microballoons. As a result we have found that the aimed object can be achieved by blending polyvinyl acetate with the vinyl chloride resin composition.

SUMMARY OF THE INVENTION

The present invention resides in a low density and low luster vinyl chloride resin composition having a superior abrasion resistance and a good microballoon-retainability, which composition comprises 100 parts by weight of a vinyl chloride copolymer including 97.0 to 99.95% by weight of vinyl chloride and 3.0 to 0.5% by weight of a polyethylene glycol diacrylate or a polyethylene glycol dimethacrylate, each having a number of ethylene glycol polymerization units of 2 to 50, and having an average polymerization degree of 600 to 3,000, 5 to 100 parts by weight of microballoons having a specific gravity of 0.15 to 0.8, a particle diameter of 5 to 300$\mu$ and a compressive strength of at least 70 Kg/cm$^2$, 1 to 20 parts by weight of a polyvinyl acetate having an average polymerization degree $\bar{P}$ of 100 to 1,500 and 30 to 150 parts by weight of a plasticizer, and steering wheels using the above composition.

DETAILED DESCRIPTION OF THE INVENTION

Figure 1:
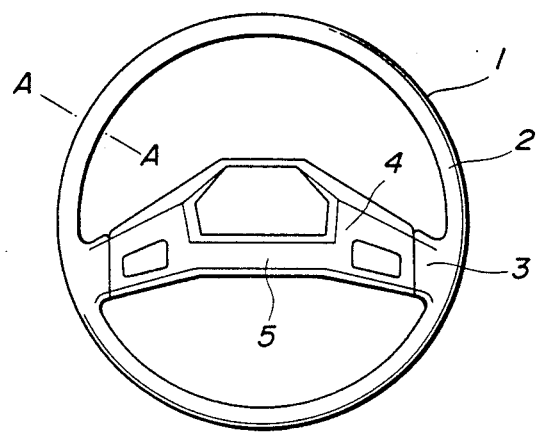
FIG. 1 shows a plan view illustrating an example of steering wheels of the present invention.

The constitution and effectiveness of the present invention will be further concretely described below.

The vinyl chloride copolymer used in the composition of the present invention is a copolymer of an ethylenic or vinylic-type monomer, such as vinyl chloride monomer or component with a polyethylene glycol diacrylate (hereinafter often abbreviated as PEGDA) or a polyethylene glycol dimethacrylate (heeinafter often abbreviated as PEGDM), each having a number of ethylene glycol polymerization units of 2 to 50. The proportion of the vinyl chloride component in this copolymer is in the range of 97.0 to 99.95% by weight, but so long as the object of the present invention is not hindered, a portion of the vinyl chloride component may include, besides vinly chloride, itself, another vinyl monomer mentioned later, and in this case, it is necessary that the vinyl chloride content of the vinyl chloride component be 50% by weight or more, preferably 70% by weight or more of the total copolymer, the upper limit being 99.95% by weight. Examples of other vinyl monomers which may be substituted for part of the vinyl chloride in the vinyl chloride component are vinylidene chloride, methyl vinyl ether, ethylene, propylene, etc.

In the present invention, PEGDA and PEGDM may be each singly copolymerized with vinyl chloride, or a mixture of the both may be copolymerized therewith, but it is necessary that the total amount of PEGDA and/or PEGDM in the copolymer be in the range of 3.0 to 0.05% by weight. If the proportion exceeds 3.0%, the resulting molded products have a roughened surface and an inferior appearance, while if it is less than 0.05%, delustering and abrasion resistance are insufficient. Further, a copolymer wherein the number of the ethylene glycol polymerization units (n) of the polyethylene glycol component in PEGDA and PEGDM is 1, cannot impart delustering effectiveneses to products molded therefrom, while if the number n exceeds 50, an efficient copolymerization thereof with vinyl chloride is difficult; hence either category of "polyethylene glycol" cannot be used in the present invention.

If the above copolymer has an average polymerization degree less than 600, its strength is insufficient, while an average degree of polymerization exceeding 3,000 results in lower processability.

The vinyl chloride copolymer used in the composition of the present invention may be obtained by polymerizing a mixture of definite amounts of vinyl chloride monomer and PEGDA or PEGDM according to known vinyl chloride polymerization processes. Namely, any process of bulk polymerization, suspension polymerization, emulsion polymerization and solution polymerization may be employed, but among these, suspension polymerization is most preferable in view of the fact that the polymerization degree and the polymerization efficiency both have a good reproducibility and the process control is easy. The average polymerization degree (hereinafter often abbreviated to $\bar{P}$) of the resulting copolymer has no particular limitation, but it is preferably in the range of 600 to 3,000.

The microballoons used in the vinyl chloride resin composition of the present invention are those having a specific gravity of 0.8 or less, a particle diameter of 5 to 300 microns and a compressive stength of 70 Kg/cm$^2$ or higher. If the specific gravity exceeds 0.8, the effectiveness of making the composition of the low density present invention is small, while if the balloons are added in a large amount, the resulting molded products have reduced mechanical strength. If the particle diameter exceeds 300 microns, clogging occurs at the strainer of the molding machine or particles are raised on the surface of molded products to damage the appearance. Further if the particle diameter is outside the range of 5$\mu$ to 300$\mu$, it is impossible to obtain molded products having a good skin layer, and hence good abrasion resistance characteristics cannot be obtained. If the compressive strength is lower than 70 Kg/cm$^2$, breakage of particles occurs in molding machine to reduce the effectiveness of making the composition lightweight.

Examples of the microballoons usable in the composition of the present invention are those of alumino silicates, borosilicate glass, silica, fly ash, epoxy resins, etc. as stock.

The amount of the filler (microballoon) blended per 100 parts by weight of the vinyl chloride copolymers is in the range of 5 to 100 parts by weight, but its suitable range varies depending on the amount of the plasticizer blended, as mentioned below. Namely, ① of the plasticizer to be blended with 100 parts by weight of the copolymers is in the range of 30 to 60 parts by weight, the amount of the filler is preferably in the range of 5 to 60 parts by weight, while ② if the amount of the plasticizer is in the range of 60 to 150 parts by weight, the amount of the filler is preferably in the range of 5 to 100 parts by weight. In the case of the above ①, if the amount of the filler added exceeds 60 parts by weight, the resulting composition has a high viscosity so that surface-roughening occurs on the surface of molded products or breakage of the filler particles occurs at the time of kneading. In the case of the above ②, even if the amount of the filler blended exceeds 100 parts by weight, contribution to making the resulting composition low density is relatively small and drawbacks such as reduction in processability, reduction in the strength of molded products, etc. become notable.

The polyvinyl acetate used in the vinyl chloride resin composition of the present invention has an average polymerization degree ($\bar{P}$) of 100 to 1,500, preferably 200 to 1,000. Those having a $\bar{P}$ less than 100 have a strong adhesiveness and an inferior workability in the mixing and molding steps. If $\bar{P}$ exceeds 1,500, its compatibility with the vinyl chloride copolymer is inferior and also microballoon-retainability is lower. The amount of the polyvinyl acetate added to 100 parts by weight of the vinyl chloride copolymer is in the range of 1 to 20 parts by weight, preferably 3 to 10 parts by weight. If the amount of the polyvinyl acetate added is less than 1% by weight, microballoon-retainability is insufficient, while if it exceeds 20 parts by weight, the surface of molded products has a stickly feeling.

In the composition of the present invention, 30 to 150 parts by weight of a plasticizer are blended with 100 parts by weight of the vinyl chloride copolymer. The kind of plasticizers used has no particular limitation and known plasticizers may be used singly or in admixture. Examples of such plasticizers are phthalate plasticizers such as dioctyl phthalate, adipate plasticizers such as dioctyl adipate, phosphoric acid ester plasticizers such as tricresyl phosphate and further, polyester plasticizers such as 1,3-butylene glycol adipate, trimellitate plasticizers such as butyl trimellitate, and epoxy plasticizers such as epoxidized soybean oil. If the amount of the plasticizer blended is less than 30 parts by weight, the resulting molded products are hard, while if it exceeds 150 parts by weight, the plasticizer exudes onto the surface of molded products.

A suitable amount of a known stabilizer is blended with the composition of the present invention, as in the case of usual vinyl chloride resin compositions. Examples of stabilizers to be blended are metal soaps such as zinc stearate, organic tin stabilizers such as dibutyltin laurate, lead stabilizers such as tribasic lead sulfate. These stabilizers may be used singly or in admixture of two or more kinds, and the amount thereof used is usually in the range of 0.5 to 5 parts by weight. UV absorbers, pigments, lubricants, processing aids, etc., as in the case of general vinyl chloride resin compositions, etc., may be blended with the composition of the present invention, in the range wherein the object of the present invention is not hindered.

The above vinyl chloride copolymer, filler, plasticizer and stabilizer and further other additives are blended to constitute a soft vinyl chloride resin composition of the present invention. The blending method has no particular limitation. Any known apparatus such as ribbon blender, V type blender, tubler mixer, Henschel mixer (trademark), etc. may be employed, and granulation by means of a monoaxial or biaxial extruder is also possible. The thus obtained composition may be molded into various kinds of soft molded products according to known molding method such as calendering, injection molding, extrusion molding, blow molding, etc.

The molded products obtained using the vinyl chloride resin composition of the present invention has a specific gravity as low as 1.0 to 1.15, a delustered surface, no luster unevenness and a good abrasion resistance without slipping off of filled microballoons. Further, when the composition of the present invention is injection-molded, a layer containing a small amount of microballoons (the so-called skin layer) is formed on the contact surface of the composition with a mold (surface of molded products) or on the contact surface thereof with insert parts, and due to the presence of this skin layer, there are exhibited various effects such as good hand feeling, prevention of slipping off of microballoons from the surface of molded products and prevention of peeling off of the composition from insert parts.

Figure 2:
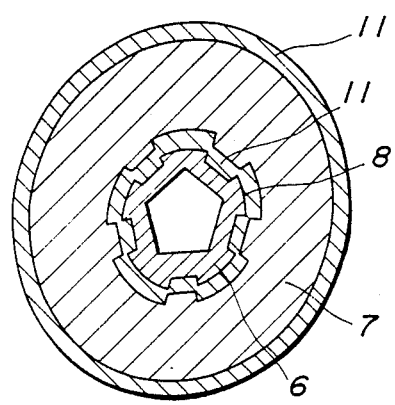
FIG. 2 shows a cross-sectional view of FIG. 1 along its A—A part.
Figure 3:
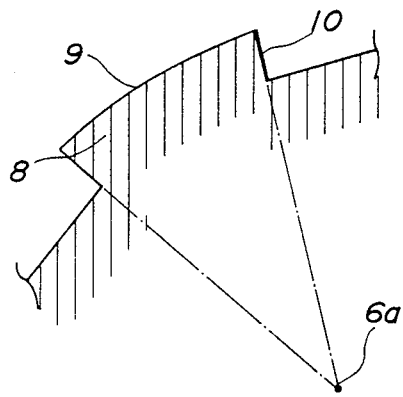
FIG. 3 shows an enlarged cross-sectional view of a part of the core material illustrated in FIG. 2.

An embodiment of the molded products using the resin composition of the present invention will be described below referring to FIGS. 1, 2 and 3.

A steering wheel 1 has a rim part 2 and on the inner side of this part is provided a spoke part 3.

Further, as to the rim part 2 and the spoke part 3, a covering layer 7 of a synthetic resin is formed outside a core material 6 made of a metal material.

The core material 6 has a cross-section of a hollow polygonal shape such as pentagonal shape. Protruded streaks or ribs 8 are respectively formed in parallel and outside each of the arris lines of the polygonal shape and along the length or longitudinal direction thereof. The respective outer peripheral surfaces 9 of the protruded streaks 8 are established on the same circumference, the center of which corresponds to the central point 6a of the core material 6, and also both the lateral surfaces 10 of the respective protruded streaks are formed so as to be directed nearly toward the central point 6a of the core material 6.

The covering layer 7 is integrally molded together with the core material 6 in a manner wherein the latter is inserted through the former to form a molded body of the synthetic resin having a specific gravity of 1.00 to 1.15. As a result of the molding, a skin layer 11 is formed on each of the inner layer and the outer layer of the covering layer 7 since cooling of these inner and outer layers is promoted by the medium of the core material 6 and the mold.

As described above, when the cross-section of the core material 6 made of a metal has a hollow polygonal shape and a protruded streak 8 is formed on the respective arris lines of the polygonal shape, then the inner side of the covering layer 7 makes contact with the respective surfaces of the core material 6, and at the same time, the respective protruded streaks 8 bite into the inner side skin layer to thereby inhibit skidding of the covering layer 7 against the core material 6 with certainty. In addition, if both the lateral surfaces 10 of the respective protruded streaks 8 are tapered, the biting of the protruded streaks into the skin layer 11 is more tightly fixed.

The present invention will be described in more detail by way of Examples and Comparative examples. In addition, the methods for measuring physical properties and properties of fillers and polyvinyl acetates employed in these examples will be collectively shown below.

(1) Average polymerization degree of polyvinyl acetate: according to JIS K 6725.
(2) Specific gravity: according to ASTM D 792.
(3) Injection molding test: Injection molding machine: 350S/550 type manufactured by Niigata Engineering Co., Ltd.; molding temperature (°C.): $C_1/130$, $C_2/140$, $C_3/155$, $C_4170$, N/170; mold: mold for steering wheels; molding temperature: 140° C.

A core metal for steering wheels was inserted into the above mold to mold a steering wheel under the above conditions, followed by evaluation of physical properties.

(4) Surface-delustered state:
  (i) Judgement by viewing: When molded products were observed, those having a smooth and lusterless surface were judged to be good (o); those having a roughened and lustrous surface, to be bad (×); and those intermediate good and bad, to be somewhat good (Δ).

(ii) Degree of luster: With the flat part (see FIG. 1; indicated by 5) of a molded product (steering wheel), gloss is measured according to JIS Z 8741 (light angle: 60-deg).

(5) Abrasion resistance:
According to new Ford abrasion test, abrasion was carried out (wet, 10,000 times; dry, 5,000 times), followed by observing the resulting surface. Unchanged surface was judged to be good, and changed surface, to be bad.

(6) Formation of skin layer:
The covering layer of the above steering wheel was cut off by a knife at 5 or more parts, followed by observing the presence or absence of the skin layer. A covering layer having the skin layer everywhere it was cut off was judged to be good (o); a covering layer which has the skin layer at a part but does not have it at another part, to be somewhat good (Δ); and a covering layer having no skin layer, to be bad (×).

(7) Peeling off of covering layer from core metal:
When formation of the skin layer was observed, a covering layer tightly adhered onto the core metal was judged to be "not peeled off" and a covering layer which could be easily peeled off by hands, to be "peeled off".

Filler A: Alumino silicate microballoon, S.G. 0.7, average particle diameter 130 microns, compressive strength 70 Kg/cm$^2$.
Filler B: Alumino silicate microballoon, S.G. 0.6, average particle diameter 150 microns, compressive strength 20 Kg/cm$^2$.
Filler C: Alumino silicate microballoon, S.G. 0.7, average particle diameter 30 microns, compressive strength 70 Kg/cm$^2$.
Polyvinyl acetate (1): $\bar{P}=200$ (Esnyl 9902, manufactured by Sekisui Kagaku).
Polyvinyl acetate (2): $\bar{P}=400$ (Esnyl 9904, manufactured by Sekisui Kagaku).
Polyvinyl acetate (3): $\bar{P}=1,800$ (Esnyl P-18, manufactured by Sekisui Kagaku).

EXAMPLES 1 AND 2 AND COMPARATIVE EXAMPLES 1~5

Various kinds of fillers, plasticizers, process aids, stabilizers and pigments were blended with a vinyl chloride copolymer (hereinafter referred to as copolymer (1)) consisting of 99.0% by weight of vinyl chloride and 1.0% by weight of a polyethylene glycol dimethacrylate having a number of ethylene glycol polymerization units of 14, and having an average polymerization degree of 1,300, according to the blending formulations indicated in Table 1, followed by mixing them by a Henschel mixer, and kneading and granulating by means of a monoaxial extruder having a screw diameter of 50 mm to obtain a vinyl chloride resin composition. Further, for comparison, a vinyl chloride homopolymer having an average polymerization degree of 1,300 (hereinafter referred to as homopolymer (1)) was substituted for the above copolymer (1), followed by the same mixing, kneading and granulating as above to obtain a vinyl chloride resin composition.

Steering wheels were molded using these compositions to evaluate their physical properties. The results are shown in Table 1.

EXAMPLES 3 AND 4 AND COMPARATIVE EXAMPLES 6 AND 7

Various kinds of fillers, plasticizers, process aids, stabilizers and pigments were blended with a vinyl chloride copolymer having an average polymerization degree of 2,500 (hereinafter referred to as copolymer (2)) consisting of 99.0% by weight of vinyl chloride and 1.0% by weight of a polyethylene glycol dimethacrylate having a number of ethylene glycol polymerization units of 4, according to the blending formulations indicated in Table 1. Further, for comparison, a vinyl chloride homopolymer having an average polymerization degree of 2,500 (hereinafter referred to as homopolymer (2)) was substituted for the above copolymer (2), followed by the same mixing, kneading and granulating as above to obtain a vinyl chloride resin composition.

Steering wheels were molded using these compositions to evaluate their physical properties. The results are shown in Table 1.

TABLE 1

| | Compar. ex. 1 | Example | | Comparative example | | | | | Example | | Comparative example | |
|---|---|---|---|---|---|---|---|---|---|---|---|---|
| | | 1 | 2 | 2 | 3 | 4 | 5 | 6 | 3 | 4 | 7 | 8 |
| Blending prescription (parts by weight) | | | | | | | | | | | | |
| Copolymer (1) | 100 | 100 | 100 | 100 | 100 | 100 | | | | | | |
| Copolymer (2) | | | | | | | | 100 | 100 | 100 | 100 | |
| Homopolymer (1) | | | | | | | 100 | | | | | |
| Homopolymer (2) | | | | | | | | | | | | 100 |
| Plasticizer (DOP) | 100 | 100 | 100 | 100 | 100 | 100 | 100 | 40 | 40 | 40 | 40 | 40 |
| Filler A | 25 | 25 | 25 | 25 | | | 25 | 45 | 45 | 45 | 45 | 45 |
| Filler B | | | | | 25 | | | | | | | |
| Filler C | | | 25 | | | 25 | | | | | | |
| Polyvinyl acetate (1) | | 5 | | | | | | | | | | |
| Polyvinyl acetate (2) | | | 5 | | 5 | 5 | 5 | | 5 | 15 | 30 | 5 |
| Polyvinyl acetate (3) | | | | 5 | | | | | | | | |
| Ba—Zn stabilizer | 2.5 | 2.5 | 2.5 | 2.5 | 2.5 | 2.5 | 2.5 | 2.5 | 2.5 | 2.5 | 2.5 | 2.5 |
| Epoxidized soybean oil | 3 | 3 | 3 | 3 | 3 | 3 | 3 | 3 | 3 | 3 | 3 | 3 |
| Carbon black | 2 | 2 | 2 | 2 | 2 | 2 | 2 | 2 | 2 | 2 | 2 | 2 |
| Evaluation of physical properties | | | | | | | | | | | | |
| S.g. | 1.09 | 1.10 | 1.10 | 1.10 | 1.14 | 1.10 | 1.09 | 1.13 | 1.14 | 1.15 | 1.17 | 1.15 |
| Delustering property (viewing) | o | o | o | o (roughened surface) | o | o | x | o | o | o | o (roughened surface) | o |
| Delustering property (gloss) | 20 | 20 | 19 | 16 | 22 | 23 | 39 | 6.0 | 6.5 | 8.1 | 4.7 | 13 |
| Abrasion resistance | Good | Good | Good | Bad | Bad | Bad | Bad | Good | Good | Good | Bad | Bad |
| Formation of skin layer | Δ | o | o | x | x | Δ | Δ | Δ | o | o | Δ | Δ |
| Peeling off | None | None | None | Yes | None | Yes | None | None | None | None | None | None |

What we claim is:

1. A low density and low luster vinyl chloride resin composition having a superior abrasion resistance and a good microballoon-retainability, which composition comprises 100 parts by weight of a vinyl chloride copolymer including 97.0 to 99.95% by weight of a vinyl chloride component and 3.0 to 0.05% by weight of a polyethylene glycol diacrylate or a polyethylene glycol dimethacrylate, each having a number of ethylene glycol polymerization units of 2 to 50, and having an average polymerization degree of 600 to 3,000, 5 to 100 parts by weight of microballoons having a specific gravity of 0.15 to 0.8, a particle diameter of 5 to 300$\mu$ and a compressive strength of at least 70 Kg/cm$^2$, 1 to 20 parts by weight of a polyvinyl acetate having an average polymerization degree of 100 to 1,500 and 30 to 150 parts by weight of a plasticizer and wherein vinyl chloride is present in said vinyl chloride component in an amount of at least 50% by weight based on the weight of the total copolymer.

2. A steering wheel having a core material covered with a covering layer including a vinyl chloride resin composition which comprises 100 parts by weight of a vinyl chloride copolymer including 97.0 to 99.95% by weight of a vinyl chloride component and 3.0 to 0.05% by weight of a polyethylene glycol diacrylate or a polyethylene glycol dimethacrylate, each having a number of ethylene glycol polymerization units of 2 to 50, and having an average polymerization degree of 600 to 3,000, 5 to 100 parts by weight of microballoons having a specific gravity of 0.15 to 0.8, a particle diameter of 5 to 300$\mu$ and a compressive strength of 70 Kg/cm$^2$ or higher, 1 to 20 parts by weight of a polyvinyl acetate having an average polymerization degree $\bar{P}$ of 100 to 1,500 and 30 to 150 parts by weight of a plasticizer, said covering layer having a skin layer formed on each of the inner layer and the outer layer thereof and wherein vinyl chloride is present in said vinyl chloride component in an amount of at least 50% by weight based on the weight of the total copolymer.

3. A steering wheel according to claim 2 wherein said core material consists of a metal material and has a cross-section of a hollow polygon and a protruded streak formed on and along each of the arris lines of the polygon.

4. The vinyl chloride resin composition according to claim 1 wherein said vinyl chloride component comprises vinyl chloride and at least one other vinyl monomer, the vinyl chloride being present in an amount of at least 70% by weight, based on the weight of the total copolymer.

5. The vinyl chloride resin composition according to claim 1 wherein said vinyl chloride component includes vinyl chloride and at least one of vinylidene chloride, methyl vinyl ether, ethylene, or propylene.

6. The vinyl chloride resin composition according to claim 1 wherein said composition additionally includes at least one of a stabilizer, a U. V. absorber, pigment, and lubricant.

7. A steering wheel according to claim 2 wherein said vinyl chloride component comprises vinyl chloride and at least one other vinyl monomer, the vinyl chloride being present in an amount of at least 70% by weight, based on the weight of the total copolymer.

8. A steering wheel according to claim 2 wherein said vinyl chloride component includes, in addition to vinyl chloride, at least one of vinylidene chloride, methyl vinyl ether, ethylene, or propylene.

9. A steering wheel according to claim 2 wherein said vinyl chloride composition additionally includes at least one of a stabilizer, U. V. absorber, pigment, and lubricant.

* * * * *